US012767068B2

(12) United States Patent
Nakano et al.

(10) Patent No.: US 12,767,068 B2
(45) Date of Patent: Oct. 20, 2026

(54) VEHICLE CONTROL DEVICE, AND OVERHEAT PROTECTION DEVICE

(71) Applicant: Hitachi Astemo, Ltd., Hitachinaka (JP)

(72) Inventors: Hiroshi Nakano, Tokyo (JP); Nobuyasu Kanekawa, Tokyo (JP); Takao Fukuda, Hitachinaka (JP); Kentaro Jumonji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 179 days.

(21) Appl. No.: 18/723,714

(22) PCT Filed: Feb. 6, 2023

(86) PCT No.: PCT/JP2023/003807

§ 371 (c)(1),
(2) Date: Jun. 24, 2024

(87) PCT Pub. No.: WO2023/195224

PCT Pub. Date: Oct. 12, 2023

(65) Prior Publication Data

US 2025/0050826 A1 Feb. 13, 2025

(30) Foreign Application Priority Data

Apr. 7, 2022 (JP) ................................ 2022-063769

(51) Int. Cl.
*B60R 16/02* (2006.01)
*H02H 5/04* (2006.01)

(52) U.S. Cl.
CPC ........... *B60R 16/0215* (2013.01); *H02H 5/04* (2013.01)

(58) Field of Classification Search
CPC .. B60R 16/0215; B60R 16/0237; H02H 5/04; H02H 6/005; H02H 7/226; G01K 3/005; G01K 7/427

(Continued)

(56) References Cited

U.S. PATENT DOCUMENTS 8,405,946 B2 3/2013 Higuchi et al.
8,767,367 B2 7/2014 Higuchi et al.
(Continued)

FOREIGN PATENT DOCUMENTS

EP 1 887 673 A1 2/2008
JP 2005-033526 A 12/2005
(Continued)

OTHER PUBLICATIONS

International Search Report and Written Opinion with English translations for PCT/JP2023/003807, mailed Apr. 18, 2023, 11 pages.

(Continued)

*Primary Examiner* — Sreeya Sreevatsa
(74) *Attorney, Agent, or Firm* — Foley & Lardner LLP

(57) ABSTRACT

A vehicle control device includes: a current detecting unit for detecting a current flowing through a lead wire, and outputting a current detection value; a current interrupting unit for interrupting the current flowing through the lead wire; and a computing unit for computing a temperature rise value caused by Joule heat in the lead wire using the current detection value, estimating an environmental temperature of an environment in which the lead wire is wired based on the temperature rise value, outside air temperature information of a vehicle, inside air temperature information in a vehicle cabin, and solar radiation information, and determining whether to output a current interruption instruction to the current interrupting unit based on the temperature of the lead wire estimated using the environmental temperature.

13 Claims, 7 Drawing Sheets

(58) Field of Classification Search
USPC .......................................................... 361/103
See application file for complete search history.

(56) References Cited

U.S. PATENT DOCUMENTS

| | | | | |
|---|---|---|---|---|
| 2010/0254059 | A1 | 10/2010 | Higuchi et al. | |
| 2013/0163138 | A1* | 6/2013 | Higuchi ................. | G01K 3/005 361/93.1 |
| 2018/0195911 | A1* | 7/2018 | Kakade .............. | B60H 1/00792 |
| 2019/0165564 | A1 | 5/2019 | Fuseya et al. | |

FOREIGN PATENT DOCUMENTS

| | | | | | |
|---|---|---|---|---|---|
| JP | 2009-130944 | A | | 6/2009 | |
| JP | 2013169113 | A | * | 8/2013 | |
| JP | 2019142316 | A | * | 8/2019 | ............... H02H 7/08 |
| JP | 2020131804 | A | * | 8/2020 | |

OTHER PUBLICATIONS

Japanese Office Action issued in corresponding JP Patent Application No. 2022-063769, dated Jul. 1, 2025 with English translation (6 pages).
Extended European Search Report issued in corresponding EP Patent Application No. 237844519.3 dated Mar. 17, 2026 (11 pages).
Hall, David E., et al., "Transient Thermal Performance of Line Traps," IEEE Transactions on Power Delivery, IEEE Service Center, New York, NY, Jan. 1, 1996, pp. 197-209.

* cited by examiner

VEHICLE CONTROL DEVICE, AND OVERHEAT PROTECTION DEVICE

TECHNICAL FIELD

The present invention relates to a vehicle control device and an overheat protection device.

BACKGROUND ART

Electrical and electronic devices have been using a fuse that is fused by Joule heat from current for protection against overheat from overcurrent. Such a fuse that interrupts the current by thermal fusing requires man-hours for replacing the fuse after the fusing. Moreover, in view of dispersion in the fusing properties of the fuse, it is required to select a thick wire harness (lead wire) in advance. Thus, use of a fuse was a factor of increase in weight and cost of the wire harness.

Therefore, a method of achieving an overheat protection function for a conventional wire harness using a semiconductor switch using a power semiconductor and a temperature estimation technique for the wire harness is used recently. This method protects the wire harness by detecting a current value flowing through the wire harness, estimating a temperature rise in the wire harness using the current value, and interrupting (turning off) the semiconductor switch.

In such an overheat protection using a semiconductor switch, since power supply can be resumed by turning the semiconductor switch on once the overcurrent is resolved, replacement of a part such as a fuse is not required. Moreover, since there is no need of considering a variation in fusing as with a conventional fuse, it is possible to use a wire harness thinner than conventional ones, thereby reducing the weight and cost.

Patent Literature 1 describes such an overheat protection technology using temperature estimation of a semiconductor switch and a wire harness. This Patent Literature 1 describes. "At every predetermined time, a flowing current is detected, a current power line temperature is estimated using the flowing current, and the current power line temperature is compared with an allowable upper limit temperature of the power line. Even when the power line temperature rises due to a short current that repeats on/off, it is possible to certainly detect the temperature rise and to interrupt the flowing current before the power line reaches a smoking temperature, thereby preventing smoking from the power line."

CITATION LIST

Patent Literature

Patent Literature 1: Japanese Unexamined Patent Application Publication No. 2009-130944

SUMMARY OF INVENTION

Technical Problem

A wire harness for a power source located in a vehicle cabin of a vehicle may be wired in a shielded space partitioned by a vehicle body material and an inner lining in the vehicle cabin. Such a shielded space includes, for example, a vehicle cabin ceiling, a door panel interior, a trunk room, and the like. The vehicle cabin ceiling is provided with a wire harness for a room lamp, a motor for an electric roof, and the like. Moreover, the door interior is provided with a wire harness for a power window motor, an electric door mirror motor, a door lock actuator, and the like. In such a shielded space, the environmental temperature of the environment in which the wire harness is installed is complicated due to an influence of heat inflow by solar radiation, an outside air temperature, and an inside air temperature of the vehicle cabin.

Traditionally, temperature of the wire harness was estimated by computing a temperature rise value caused by self-heating of the wire harness to which a current is applied and adding the temperature rise value to a reference temperature of the environment in which the wire harness is provided. However, an error in the reference temperature can lead to a wrong estimated temperature, making it difficult to interrupt the current at an appropriate temperature. When the estimated temperature of the wire harness is higher than an actual temperature, an amount of the available current decreases, causing a sudden current interruption. To the contrary, when the estimated temperature is lower than the actual temperature, the current cannot be interrupted properly even if the wire harness is overheated.

As a method of obtaining the reference temperature, it can be conceived to install a temperature sensor near the wire harness to be estimated. However, this method requires installation of the temperature sensor with respect to each of many wire harnesses installed in the vehicle, which increases component costs and man hours for installing the temperature sensor. To suppress such a cost increase, a method of setting information about the temperature sensor or the like in the equipment loaded on the vehicle as the reference temperature can be conceived.

However, since the wire harness provided inside the ceiling or the door interior of the vehicle is shielded by the inner lining in the vehicle cabin, the temperature information can be different from that inside the vehicle cabin. Moreover, under an environmental condition with strong solar radiation, the environmental temperature can be more different from the temperature inside the vehicle cabin or the outside air temperature, which increases the estimated temperature error due to the temperature rise caused by the solar radiation. Therefore, there is a need for properly estimating the environmental temperature of the environment in which the wire harness is provided, which is the basis of estimating the temperature of the wire harness.

The present invention has been made in view of such a situation, and aims to properly estimate a temperature of a lead wire.

Solution to Problem

A vehicle control device according to the present invention includes: a current detecting unit that detects a current flowing through a lead wire and outputs a current detection value; a current interrupting unit that interrupts the current flowing through the lead wire; and a computing unit that computes a temperature rise value caused by Joule heat in the lead wire using the current detection value, estimates an environmental temperature of the environment in which the lead wire is wired based on the temperature rise value, outside air temperature information of a vehicle, inside air temperature information in the vehicle cabin, and solar radiation information, and determines whether to output a current interrupting instruction to the current interrupting unit based on the temperature of the lead wire estimated using the environmental temperature.

Advantageous Effects of Invention

According to the present invention, since temperature of a lead wire can be appropriately estimated, it is made possible to appropriately interrupt a current flowing through the lead wire.

Objects, configurations, and effects other than the above will be apparent from the description of the following embodiments.

DESCRIPTION OF EMBODIMENTS

Figure 1:
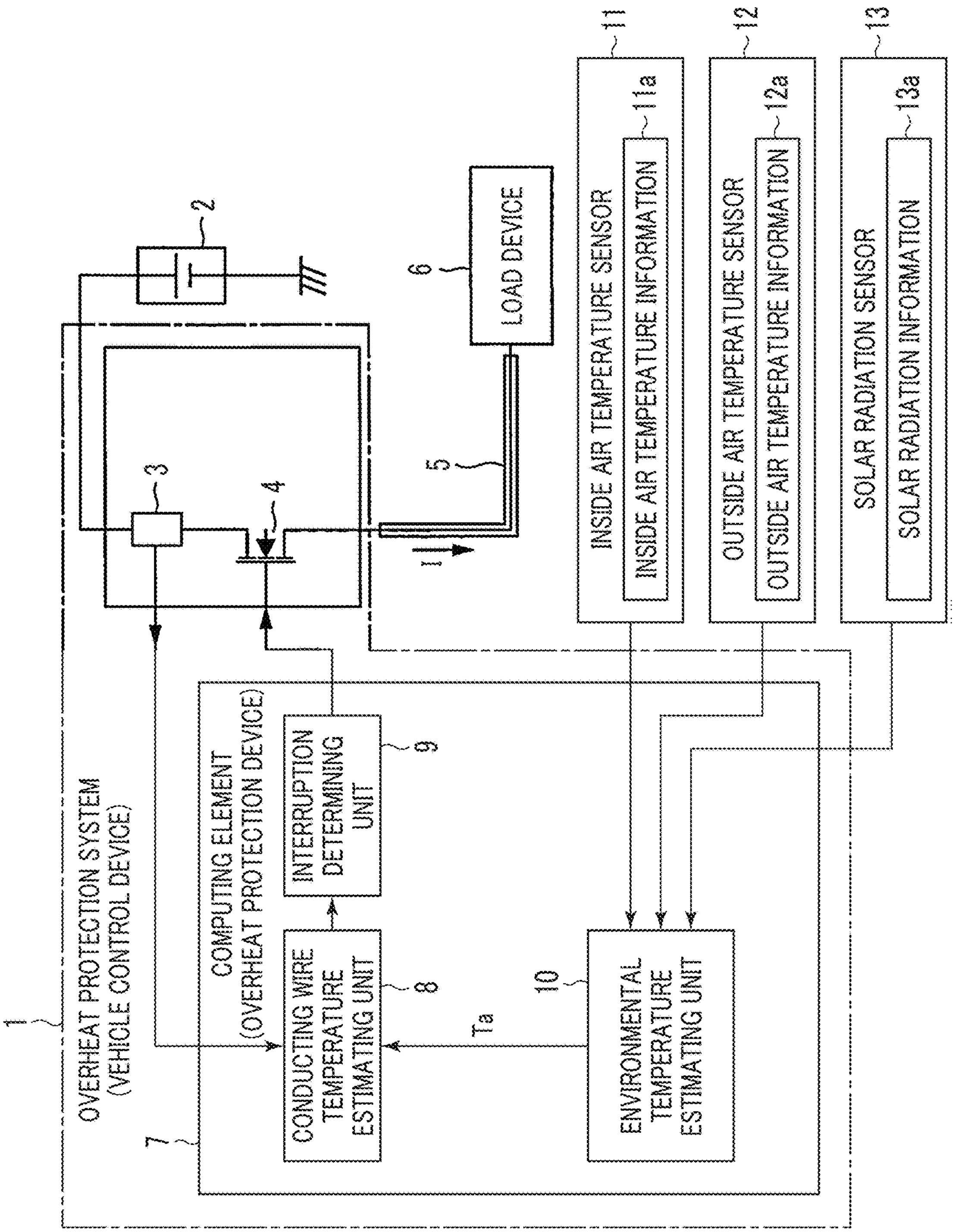
FIG. 1 is a diagram showing a basic configuration of an overheat protection system for a wire harness according to a first embodiment of the present invention.

In the following, embodiments of the present invention will be described with reference to accompanying drawings. Components having a substantially identical function or configuration will not be described again by denoting those components with an identical reference numerals.

First Embodiment

FIG. 1 is a diagram showing a basic configuration of an overheat protection system 1 for a wire harness 5. The overheat protection system 1 is an example of a vehicle control device to which the present invention is applied.

The overheat protection system 1 controls a current I supplied to a load device 6 through the wire harness 5.

The wire harness 5 is arranged along an inside of a shielded space 23 of a pillar and a ceiling of a vehicle 20 shown in FIG. 3 to be described later.

The load device 6 is an actuator that operates the vehicle 20 via a motor, a solenoid, and the like. Electric power for the load device 6 is supplied from a battery 2 loaded on the vehicle 20.

Connected to a power supply path between the battery 2 and the load device 6 are a current detecting element 3, an interrupting element 4, and the wire harness 5. The current detecting element 3 detects a current value of the current I flowing through the wire harness 5.

The current detecting unit (current detecting element 3) detects the current flowing through the lead wire (wire harness 5) and outputs a current detection value. The current detecting element 3 includes a shunt resistor connected to the power source supply path in series, and is able to detect the current I based on a voltage drop in the shunt resistor. Moreover, the current detecting element 3 can also detect the current I using a current sensing power MOSFET (Metal Oxide Semiconductor Field Effect Transistor) as the interrupting element 4.

The current interrupting unit (interrupting element 4) interrupts the current flowing through the lead wire (wire harness 5). This interrupting element 4 is a semiconductor switch such as a power MOSFET, and has a function of interrupting the power supply to the load device 6 via the wire harness 5.

The overheat protection system 1 includes a computing element 7.

A computing unit (computing element 7) computes a temperature rise value caused by Joule heat in the lead wire (wire harness 5) using the current detection value. Then, the computing unit (computing element 7) estimates an environmental temperature Ta of the environment in which the lead wire (wire harness 5) is wired based on the temperature rise value, outside air temperature information 12*a* of the vehicle 20, inside air temperature information 11*a* in the vehicle cabin, and solar radiation information 13*a*. Furthermore, the computing unit (computing element 7) determines whether to output a current interrupting instruction to the current interrupting unit (interrupting element 4) based on the temperature of the lead wire (wire harness 5) estimated using the environmental temperature Ta. The computing element 7 is used as an example of an overheat protection device that protects the wire harness 5 from overheat. The computing element 7 includes a conducting wire temperature estimating unit 8, an interruption determining unit 9, and an environmental temperature estimating unit 10.

In addition to a microcomputer, a DSP (Digital signal processor), an FPGA (Field Programmable gate array), and the like can be used as the computing element 7. The computing element 7 estimates the environmental temperature Ta of the environment in which the wire harness 5 is installed, and estimates the temperature of the wire harness 5 based on the environmental temperature Ta and the Joule heat generated in the wire harness 5. The computing element 7 then determines whether to interrupt the power supply to the load device 6 through the wire harness 5.

The computing unit (computing element 7) estimates the temperature of the lead wire (wire harness 5) by adding the environmental temperature Ta in the shielded space (shielded space 23) to the temperature rise value. For example, the conducting wire temperature estimating unit 8 estimates the temperature of the wire harness 5 by calculating the temperature rise value using current information input from the current detecting element 3 and adding an estimated value of the environmental temperature Ta of the environment in which the wire harness 5 is installed to the temperature rise value. In the estimating operation for the temperature of the wire harness 5, a heat value of the wire harness 5 to be estimated and a heat dissipation characteristics model are used. A specific example of a method of estimating the temperature of the wire harness 5 will be described later.

The interruption determining unit 9 determines to interrupt the current if the temperature estimation value from the conducting wire temperature estimating unit 8 is higher than a predetermined threshold, and outputs an interruption signal to the interrupting element 4. The interrupting element 4 interrupts the current I flowing through the wire harness 5 based on the interrupting instruction from the interruption determining unit 9.

The environmental temperature estimating unit 10 estimates the environmental temperature Ta of the environment in which the wire harness 5 is installed based on the inside air temperature information 11*a* of the vehicle 20, the outside air temperature information 12*a*, and the solar radiation information 13*a*. The environmental temperature Ta estimated by the environmental temperature estimating unit 10 is output to the conducting wire temperature estimating unit 8. Here, the computing unit (environmental temperature estimating unit 10) obtains the outside air temperature information 12*a* from an outside air temperature detecting unit (outside air temperature sensor 12) installed in the vehicle 20, obtains the inside air temperature information 11*a* from an inside air temperature detecting unit (inside air temperature sensor 11) installed in the vehicle 20, and obtains the solar radiation information 13*a* from a solar radiation detecting unit (solar radiation sensor 13) installed in the vehicle 20.

The inside air temperature information 11*a* can be obtained from the inside air temperature sensor 11 that detects the temperature inside the vehicle cabin. The inside air temperature sensor 11 is installed in a location shielded from the solar radiation such as an interior of an instrument panel in the vehicle cabin. For example, a thermistor used for controlling an air conditioner can be used as the inside air temperature sensor 11.

The outside air temperature information 12*a* can be obtained from the outside air temperature sensor 12 loaded on the vehicle 20. The outside air temperature sensor 12 is desirably installed at a location not affected by a heat source of the vehicle 20 such as a thermistor for engine control that is installed in a front part of the vehicle 20.

The solar radiation information 13*a* can be obtained from the solar radiation sensor 13 for controlling the air conditioner, for example. The solar radiation sensor 13 is installed on a dashboard in a vehicle cabin front part and detects the solar radiation entering through a windshield by a photodiode. Another example of the solar radiation sensor 13 may be a sensor used for an auto head light.

It should be noted that the solar radiation information 13*a* can also be obtained from brightness information or the like from a front camera, a side camera, a rearview camera loaded on the vehicle 20 for driving assistance. The solar radiation information can be obtained via an in-vehicle network such as a CAN (Controller Area Network).

Next, a hardware configuration of a computing device 50 constituting the overheat protection system 1 is described.

Figure 2:
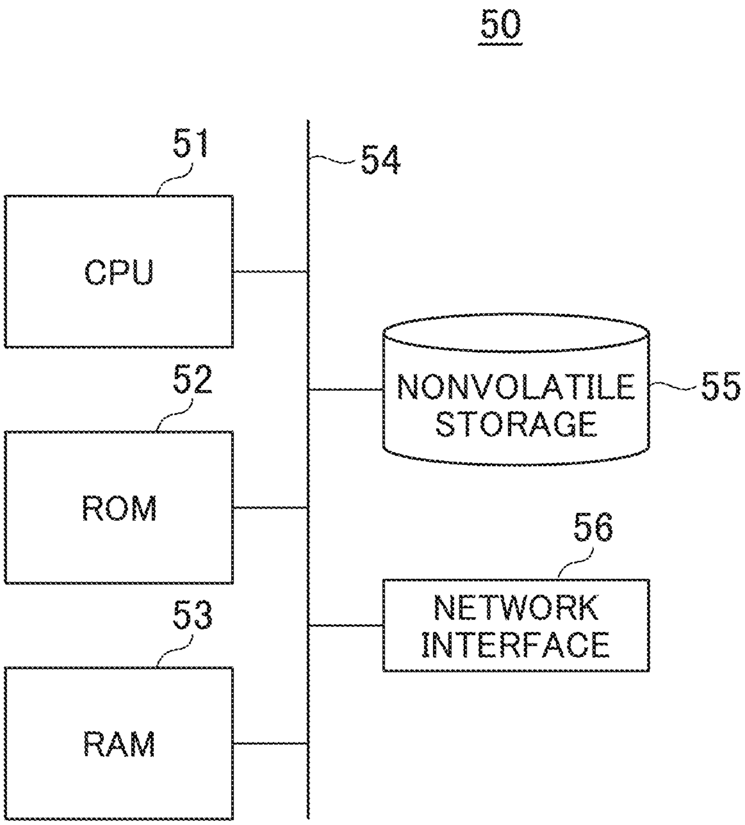
FIG. 2 is a block diagram showing an example hardware configuration of a computing device according to the first embodiment of the present invention.

FIG. 2 is a block diagram showing an example hardware configuration of the computing device 50. The computing device 50 is an example of hardware used as a computer operable as the overheat protection system 1 according to this embodiment. The overheat protection system 1 according to this embodiment achieves an environmental temperature estimating method performed by each functional block shown in FIG. 2 in combination by the computing device 50 (computer) executing a program. It should be noted that the microcomputer, the DSP, and the FPGA described above may be used as the computing device 50.

The computing device 50 includes a CPU (Central Processing Unit) 51, a ROM (Read Only Memory) 52, and a RAM (Random Access Memory) 53 respectively connected to a bus 54. Furthermore, the computing device 50 includes a nonvolatile storage 55 and a network interface 56.

The CPU 51 reads a program code of software that achieves each function according to this embodiment from the ROM 52, loads the program code to the RAM 53, and executes the program code. Variables and parameters generated in the middle of arithmetic processing by the CPU 51 are temporarily written into the RAM 53, and these variables and parameters and the like are read by the CPU 51 as appropriate. However, an MPU (Micro Processing Unit) may be used instead of the CPU 51.

For example, an HDD (Hard Disk Drive), an SSD (Solid State Drive), a flexible disk, an optical disk, a magneto-optical disk, a CD-ROM, a CD-R, a magnetic tape, a nonvolatile memory, or the like is used as the nonvolatile storage 55. In addition to an OS (Operating System) and various parameters, a program for operating the computing device 50 is recorded in the nonvolatile storage 55. The ROM 52 and the nonvolatile storage 55 record therein a program, data, and the like necessary for the CPU 51 to operate, and are used as examples of a computer readable non-transitory storage medium that stores therein the program to be executed by the computing device 50.

For example, an NIC (Network Interface Card) or the like is used as the network interface 56, allowing for transmitting/receiving various data between devices via the CAN connected to a terminal of the NIC, a dedicated line, and the like.

Figure 3:
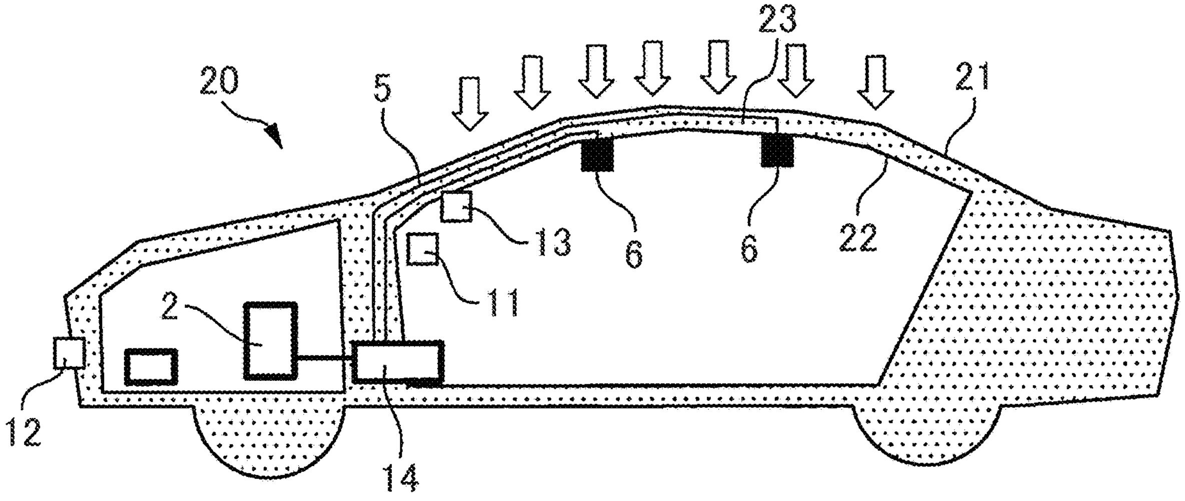
FIG. 3 is a diagram showing an example in which the overheat protection system is applied to the wire harness provided to a ceiling of a vehicle according to the first embodiment of the present invention.

FIG. 3 is a diagram showing an example in which the overheat protection system 1 is applied to the wire harness provided to a ceiling of the vehicle 20 according to the present embodiment. FIG. 3 is a cross-sectional view of the vehicle 20 as seen from its side.

For example, a room lamp installed on the ceiling inside the vehicle cabin is used as the load device 6. Electric power is supplied from the battery 2 installed in the front part of the vehicle 20 to a power source distribution unit 14 installed in the vehicle cabin (an example of an on-board power source distribution device). The load device 6 is then driven by the power supplied from the power source distribution unit 14 via the wire harness 5. The power source distribution unit 14 is constituted as the overheat protection system 1 shown in FIG. 1. In this manner, the overheat protection system 1 and the overheat protection device are also applicable to the path for supplying a current for the on-board power source distribution device that distributes the power supplied from the battery 2 to each unit in the vehicle 20. Therefore, the power source distribution unit 14 can aggregate various information detected by each sensor, perform temperature estimation on the wire harness 5 in each zone of the vehicle 20, and interrupt power sharing to the load device 6 as needed.

The wire harness 5 is connected to the load device 6 and the power source distribution unit 14 through the pillar and the ceiling of the vehicle 20. The wire harness 5 is provided in a space between a body 21 of the vehicle 20 and an inner lining 22 in the vehicle cabin. The body 21 is a portion that receives the solar radiation such as the pillar, the ceiling, the door, and the like of the vehicle 20. The current detecting element 3, the interrupting element 4, and the computing element 7 are disposed in the power source distribution unit 14. The power source distribution unit 14 estimates the temperature of the wire harness 5 passing through the ceiling of the vehicle 20 and protects the wire harness from the overheat.

The shielded space 23 is formed between the outside air environment and the inside air environment of the vehicle 20, which is thermally shielded from the outside air environment and the inside air environment and in which the lead wire is wired. Thus, the environment in which the lead wire (wire harness 5) is wired is the shielded space (shielded space 23) in which the lead wire (wire harness 5) is wired. In addition, the wire harness 5 is arranged in the shielded space 23 of the ceiling shielded from the inside of the vehicle cabin and the outside of the vehicle. Therefore, the wire harness 5 is placed in an environment in which the environmental temperature changes not only by the outside air temperature and the inside air temperature of the vehicle 20 but also by the solar radiation.

The environmental temperature estimating unit 10 according to this embodiment obtains the outside air temperature information 12*a* from the outside air temperature sensor 12 installed in the front part of the vehicle 20. Moreover, the environmental temperature estimating unit 10 obtains the inside air temperature information 11*a* from the inside air temperature sensor 11 installed in the vehicle cabin. Furthermore, the environmental temperature estimating unit 10 obtains the solar radiation information 13*a* from the solar radiation sensor 13 installed inside the instrument panel in the vehicle cabin. The environmental temperature estimating unit 10 estimates the environmental temperature Ta in the shielded space 23 in which the wire harness 5 is installed based on these three pieces of information.

Figure 4:
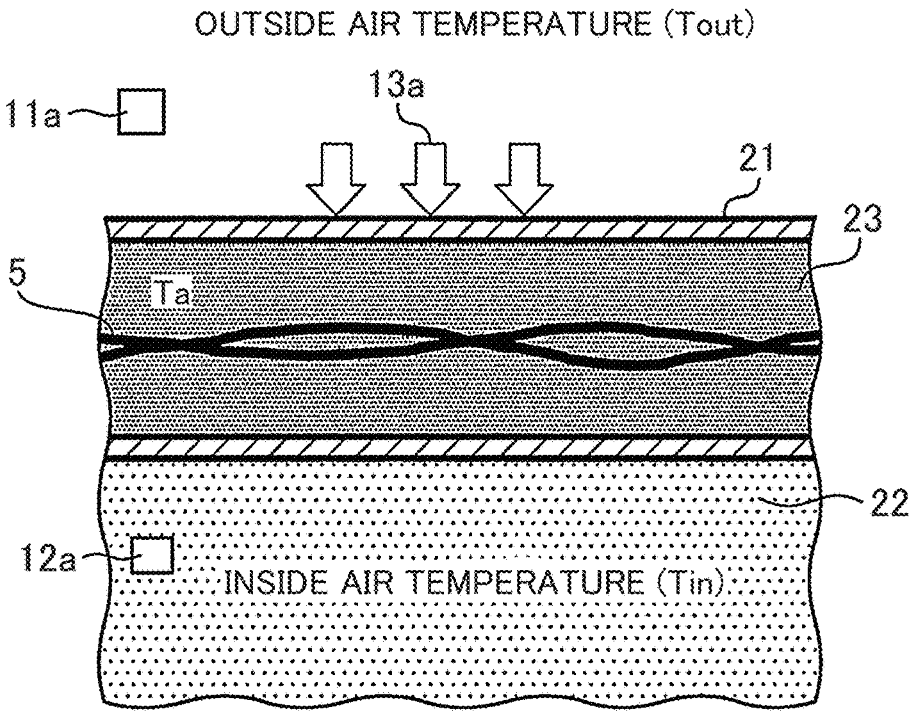
FIG. 4 is a diagram showing a general form of a ceiling space in which the wire harness is installed according to the first embodiment of the present invention.

FIG. 4 is a diagram showing a general form of the shielded space 23 in which the wire harness 5 is installed.

As described above, the shielded space (shielded space 23) is formed between the outside air environment of the vehicle 20 and the inside air environment of the vehicle 20, which is thermally shielded from the outside air environment and the inside air environment and in which the lead wire (wire harness 5) is wired. Furthermore, the wire harness 5 is provided in the shielded space 23 shielded by the body 21 of the a and the inner lining 22 in the vehicle cabin. The outside of the body 21 is the outside air environment, and the inside of the inner lining 22 is the inside air environment. The outside air temperature information 12*a* is the temperature information of the outside air environment, and the inside air temperature information 11*a* is the temperature information of the inside air environment. The environmental temperature estimating unit 10 shown in FIG. 1 estimates the environmental temperature Ta in the shielded space 23 using the inside air temperature information 11*a*, the outside air temperature information 12*a*, and the solar radiation information 13*a*.

Figure 5:
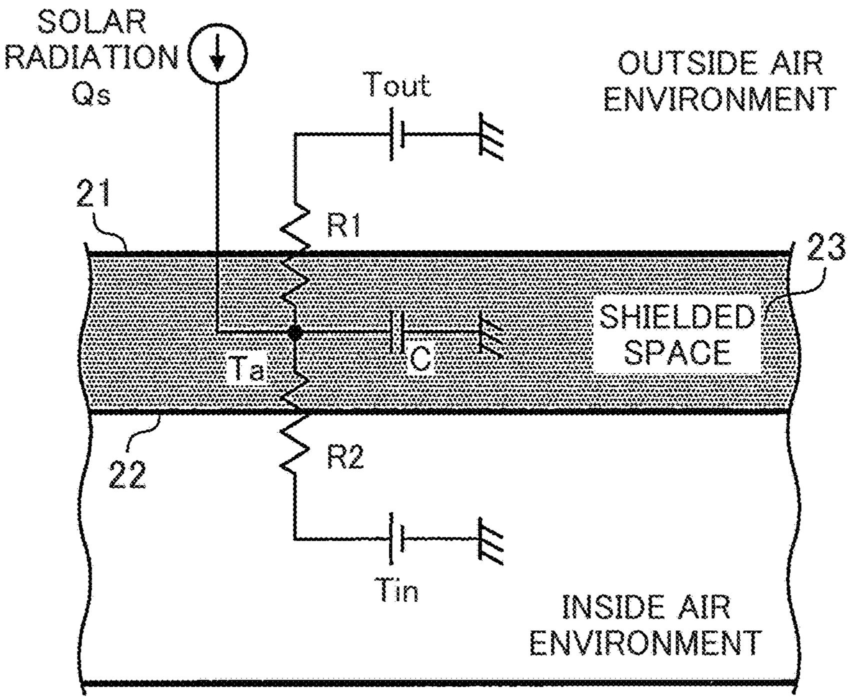
FIG. 5 is a diagram showing a heat inflow in a shielded space as an equivalent thermal circuitry according to the first embodiment of the present invention.

FIG. 5 is a diagram showing a heat inflow in the shielded space 23 as an equivalent thermal circuitry. FIG. 5 shows a principle by which the environmental temperature estimating unit 10 estimates the environmental temperature Ta in the shielded space 23.

In the equivalent thermal circuitry shown in FIG. 5, the outside air temperature in the outside air environment is denoted by a voltage source Tout, the inside air temperature in the outside air environment is denoted by a voltage source Tin, the shielded space 23 is denoted by a heat capacity C, and the heat inflow Qs caused by the solar radiation is denoted by a current source. The environmental temperature estimating unit 10 estimates the environmental temperature in the shielded space (shielded space 23) by adding the temperature rise value based on the solar radiation information 13*a* to a weighted average value of the inside air temperature information 11*a* and the outside air temperature information 12*a*.

Heat is conducted from the outside air temperature Tout outside the vehicle cabin to the heat capacity C of the shielded space 23 via a heat resistance R1 of the body 21 of the vehicle 20. Moreover, the heat is conducted from the inside of the vehicle cabin to the heat capacity C via a heat resistance R2 of the inner lining 22. Furthermore, the heat inflow Qs caused by the solar radiation flows into the shielded space 23. Assuming a steady state, the temperature Ta in the shielded space 23 is obtained by the following formula (1) (also referred to as model formula (1)). It should be noted that the heat capacity C is not included in the formula (1) since the heat capacity C of the shielded space 23 is assumed to be open, namely non-existent, in the steady state.

[Numeral 1]

$$T_a = \frac{R_1 T_{in} + R_2 T_{out}}{R_1 + R_2} + Q_s \frac{R_1 R_2}{R_1 + R_2} \quad (1)$$

The formula (1) indicates that the environmental temperature estimating unit 10 can estimate the environmental temperature Ta by adding the temperature rise caused by the heat inflow Qs due to the solar radiation to the weighted average value corresponding to the heat resistance R1 and the heat resistance R2 of the outside air temperature Tout and the inside air temperature Tin, respectively.

Figure 6:
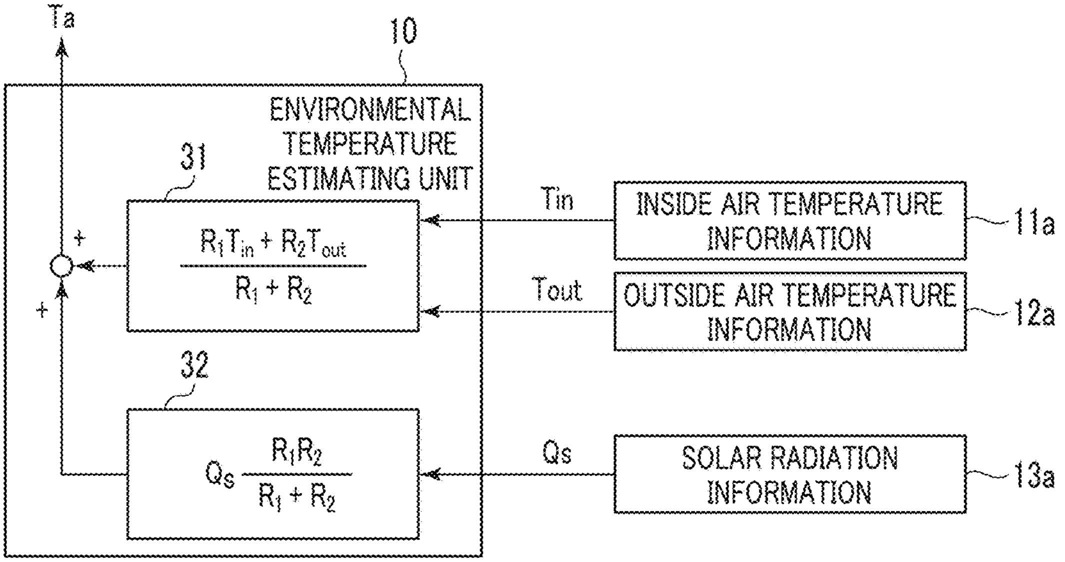
FIG. 6 is a block diagram of an estimating operation in an environmental temperature estimating unit using a model formula (1) according to the first embodiment of the present invention.

FIG. 6 shows a block diagram of an estimating operation in the environmental temperature estimating unit 10 using the above model formula (1).

The environmental temperature estimating unit 10 includes a first term computing unit 31 and a second term computing unit 32 for the model formula (1).

The first term computing unit 31 calculates the first term of the formula (1) using the inside air temperature information 11*a* (Tin) and the outside air temperature information 12*a* (Tout) as inputs.

The second term computing unit 32 calculates the second term of the formula (1) using the heat inflow Qs due to the solar radiation, the heat resistance R1 of the body 21 of the vehicle 20, and the heat resistance R2 of the inner lining 22 as inputs.

The environmental temperature estimating unit 10 estimates the environmental temperature Ta by adding an arithmetic result of the first term computing unit 31 and an arithmetic result of the second term computing unit 32, and outputs the environmental temperature Ta to the conducting wire temperature estimating unit 8.

More preferably, setting the heat resistance R1 based on the heat conductivity corresponding to a quality and a thickness of the body material of the vehicle 20 makes it possible to further improve the precision of the environmental temperature Ta estimated by the environmental temperature estimating unit 10. Therefore, the computing unit (environmental temperature estimating unit 10) sets the weighted average value of the heat resistance R1 and the heat resistance R2 of the outside air temperature Tout and the inside air temperature Tin, respectively, according to the quality of the body material of the vehicle 20 that shields between the outside air environment and the shielded space (shielded space 23) and the quality of an inner lining material that shields between the inside air environment and the shielded space (shielded space 23). For example, setting the heat resistance R1, R2 based on the heat conductivity corresponding to the material and structure of the inner lining 22 in the vehicle cabin makes it possible to further improve the precision of the environmental temperature Ta estimated by the environmental temperature estimating unit 10.

Moreover, the computing unit (environmental temperature estimating unit 10) sets a coefficient of the solar radiation information 13*a* according to emissivity of the body material of the vehicle 20 that shields between the outside air environment and the shielded space (shielded space 23). For example, setting the coefficient k to the heat inflow Qs obtained from the solar radiation information 13*a* in the formula (1) and setting the coefficient k based on the emissivity corresponding to the material quality and color of the body 21 make it possible to further improve the precision of the environmental temperature Ta estimated by the environmental temperature estimating unit 10. It should be noted that the set values of the heat resistance R1, R2, and the coefficient k are preset for each vehicle type at the time of manufacturing the automobiles.

In this embodiment, a method of computing the environmental temperature Ta by the environmental temperature estimating unit 10 using the formula (1) is described. However, the environmental temperature estimating unit 10 may use a method of including in advance a table or map data indicative of relationship among the inside air temperature information 11*a* (Tin), the outside air temperature information 12*a* (Tout), and the solar radiation information 13*a* (Qs), and calculating the environmental temperature Ta according to the information.

Next, an example method of estimating the temperature rise value caused by Joule heat generated by the current I flowing through the wire harness 5 in the conducting wire temperature estimating unit 8 is described.

Figure 7:
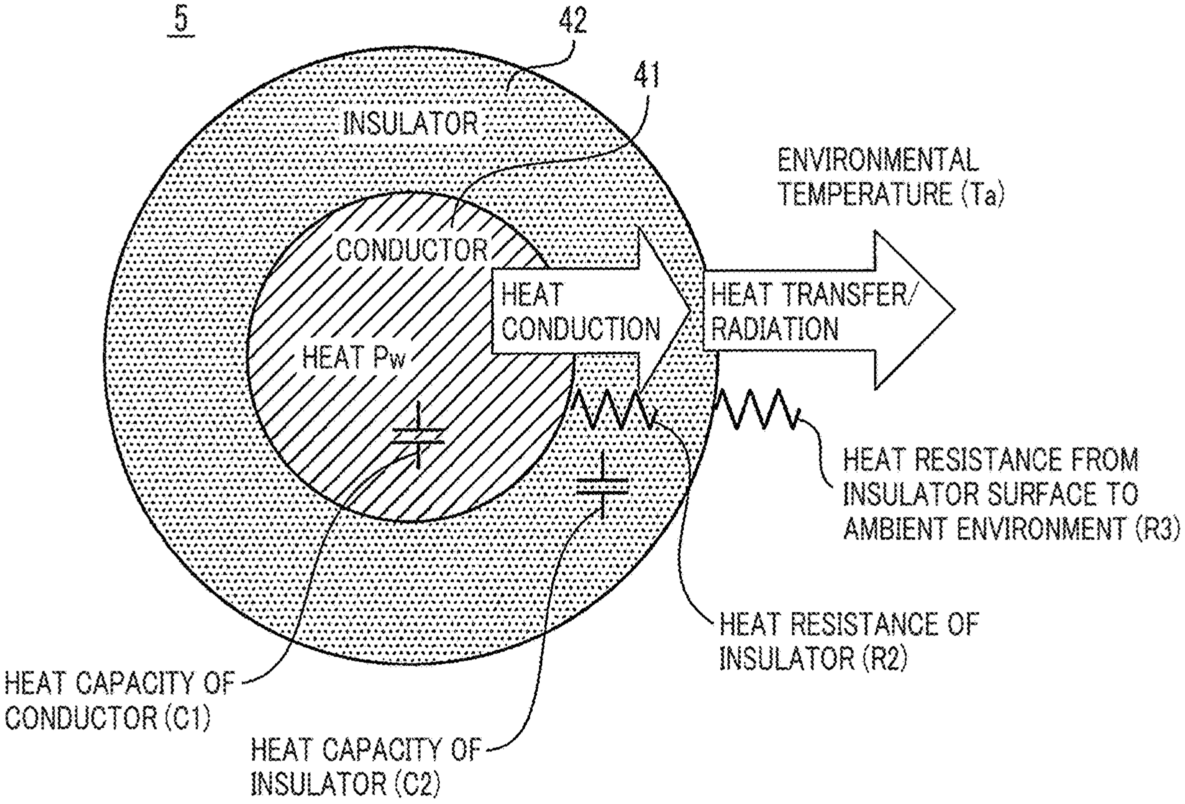
FIG. 7 is a cross-sectional view of the wire harness according to the first embodiment of the present invention.

FIG. 7 is a cross-sectional view of the wire harness 5. FIG. 7 shows a heat dissipation path of the wire harness 5.

The wire harness 5 is constituted by a conductor 41 consisting a conductor in which the current I flows and an insulator 42 that covers the conductor 41. When the current I flows in the conductor 41, the heat generation Pw derived from Joule heat is generated by electric resistance of the conductor. The heat generation Pw is stored in a heat capacity C1 of the conductor and conducted to the insulator 42 at the same time.

In the insulator 42, heat is stored in a heat capacity C2 of the insulator 42 and conducted to the surface of the insulator 42 via the heat resistance R2 of the insulator 42 at the same time. Then, the heat is dissipated from the surface of the insulator 42 into ambient air of the wire harness 5. The heat dissipation into the ambient air of the wire harness 5 is determined by the heat transfer coefficient and heat resistance R3 that is determined by the radiant heat.

Figure 8:
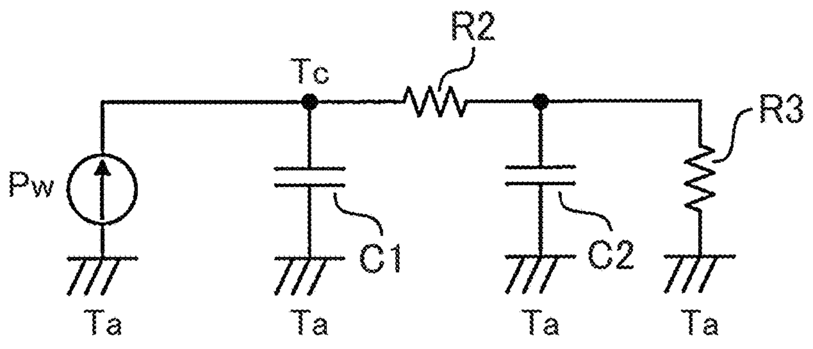
FIG. 8 is a circuit diagram representing a heat dissipation model of the wire harness according to the first embodiment of the present invention.

FIG. 8 is a circuit diagram representing a heat dissipation model of the wire harness 5.

As shown in FIG. 8, after being store in the heat capacity C1 of the conductor, the heat of the heat generation Pw is stored in the heat capacity C2 of the insulator 42 via the heat resistance R2 of the insulator 42. After the heat is stored in the heat capacity C2 of the insulator 42, the heat is then dissipated into the ambient air of the wire harness 5 via the heat resistance R3.

Figure 9:
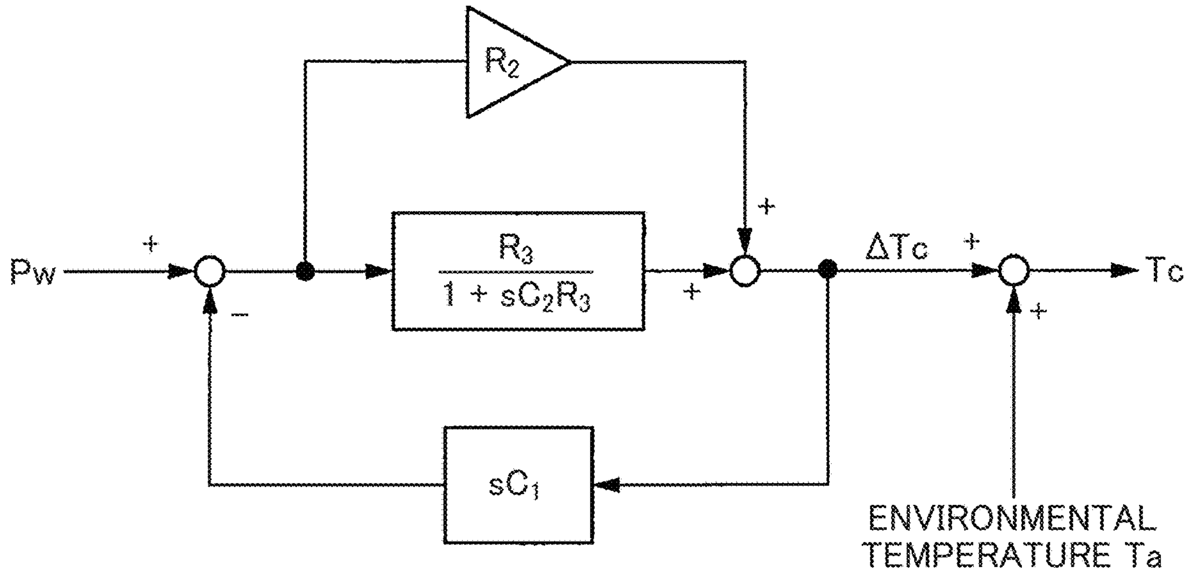
FIG. 9 is a block diagram showing the equivalent thermal circuitry converted into a transfer function according to the first embodiment of the present invention.

FIG. 9 is a block diagram showing the equivalent thermal circuitry converted into a transfer function. In this transfer function, an input is denoted by a heat value Pw and an output is denoted by a conductor temperature Tc.

Moreover, the conductor temperature Tc of the wire harness 5 is estimated based on the transfer function shown in FIG. 9. The environmental temperature Ta in FIG. 9 is the temperature Ta in the shielded space 23 in which the wire harness 5 is installed as described above. The temperature Tc of the wire harness 5 can be estimated by adding a temperature rise value ΔTc caused by Joule heat in the wire harness 5 on the basis of the detected current value detected by the current detecting element 3 to the temperature Ta in the shielded space 23.

The computing element 7 in the overheat protection system 1 according to the first embodiment described above can estimate the temperature of the wire harness 5 based on the outside air temperature Tout of the vehicle 20, the inside air temperature Tin in the vehicle cabin, and the solar radiation information 13*a* (Qs). Therefore, it is possible to estimate the environmental temperature Ta in the shielded space 23 affected by the solar radiation without adding a new temperature sensor in the shielded space 23 in which the wire harness 5 is installed. For example, when five wire harnesses 5 are wired in the ceiling of the vehicle 20, a temperature sensor used to be provided to each wire harness 5. On the other hand, in this embodiment, since the environment in which each wire harness 5 is wired is common, it is made possible to estimate the temperatures of respective wire harnesses 5 by the computing element 7 estimating the environmental temperature Ta at only one location. In this manner, the environmental temperature estimating unit 10 appropriately estimating the environmental temperature Ta prevents an error between the estimated temperature of the wire harness and the actual temperature.

Moreover, since the environmental temperature estimating unit 10 obtains the environmental temperature Ta used for the temperature estimation of the wire harness 5 with a low cost and a high precision, the temperature estimation precision of the wire harness 5 is improved. Since the conducting wire temperature estimating unit 8 can appropriately estimate the temperature of the wire harness 5, it is made possible for the interruption determining unit 9 to appropriately interrupt the current flowing through the wire harness 5 at the time of the overcurrent. This makes it possible to certainly detect the overtemperature of the wire harness and interrupt the overcurrent to the load device 6 even if the battery 2 does not excessively limit the current suppliable to the load device 6. Moreover, since the temperature estimation precision of the wire harness 5 is improved, it is made possible to relax a design margin and design the wire harness 5 thinner. This makes it possible to reduce the weight and cost of the wire harness 5 wired in the vehicle 20.

The overheat protection system 1 according to this embodiment allows for replacement of a protection circuit that uses the conventional fuse and relay. Moreover, since temperature monitoring of the wire harness 5 is possible, it is made possible for the overheat protection system 1 to disperse current load on a power network for supplying electric power to each unit.

Although the above embodiment is described taking an example of applying the present invention to the temperature estimation of the wire harness 5 for the room lamp provided in the ceiling in the vehicle cabin, the present invention is not limited thereto. For example, the present invention can also be applied to such a wire harness 5 that supplies power to a load device such as a map lamp disposed on the ceiling in the vehicle cabin, a digital room mirror, an electric roof, a flashing light, a LiDAR (Light Detection and Ranging) and a camera for outside view recognition. In addition, the present invention is also applicable to the wire harness 5 that transmits electric power, such as a solar panel disposed on the top surface of the vehicle 20.

Moreover, since the door panel interior in the vehicle cabin and the inside of the side face of the body 21 are also included in the shielded space 23 affected by the solar radiation, the present invention is also applicable to the wire harness 5 provided in this shielded space 23. Furthermore, the shielded space 23 may be disposed near a brake, for example. The load device 6 used in such a location includes, for example, a power window, an electric door mirror, a side camera, a door lock actuator, a turn signal lamp, a stop lamp, a rear wiper actuator, a license plate lamp, and the like. The present invention can also be applied to the wire harness 5 for supplying electric power to these load devices 6. The present invention can also be applied to temperature estimation in the trunk room separate from the vehicle cabin.

Moreover, the computing element 7 may check the temperature of the wire harness 5 estimated by the method of this embodiment with the temperature obtained from the temperature sensor already provided to the wire harness 5. If the estimated temperature of the wire harness 5 deviates from the temperature obtained from the temperature sensor already provided to the wire harness 5, a failure of each sensor in the vehicle 20 can be considered.

The computing element 7 may also obtain the inside air temperature information 11*a* from a sensor other than the inside air temperature sensor 11. Similarly, the computing element 7 may obtain the outside air temperature information 12*a* from a sensor other than the outside air temperature sensor 12, and may obtain the solar radiation information 13*a* from a sensor other than the solar radiation sensor 13.

Moreover, the overheat protection system 1 and the overheat protection device according to this embodiment can be applied to a path by which an on-vehicle ECU (engine ECU (Electronic Control Unit), zone ECU) supplies a current to an actuator (such as a motor), a fuse, a relay box, and the like. The overheat protection system 1 and the overheat protection device may be included in the on-vehicle ECU and the zone ECU.

The overheat protection system 1 and the overheat protection device according to this embodiment may also be applied to an integrated ECU on the vehicle. In this case, the integrated ECU preferably aggregates information detected by each sensor, thereby estimating the temperature of the shielded space and the wire harness 5 in each area of the vehicle and transmitting information about the estimated temperature to the power source distribution device. Thus, the power source distribution device is allowed to take a measure such as to reduce the electric power supplied to the area in which the wire harness 5 is installed, the wire harness 5 having a higher temperature than a reference value, by receiving the temperature information.

Second Embodiment

Next, an example configuration of the overheat protection system 1 according to a second embodiment of the present invention will be described.

Although the above-described first embodiment showed an example of obtaining the inside air temperature information 11*a*, the outside air temperature information 12*a*, and the solar radiation information 13*a* in the environmental temperature estimating unit 10 from sensors loaded on the vehicle 20 via the in-vehicle network, implementation of the present invention is not limited thereto. The overheat protection system 1 according to the second embodiment can also obtain weather information and date and time information from the outside of the vehicle 20 via a radio network such as a mobile phone network and set the outside air temperature information and the solar radiation information using this information.

Figure 10:
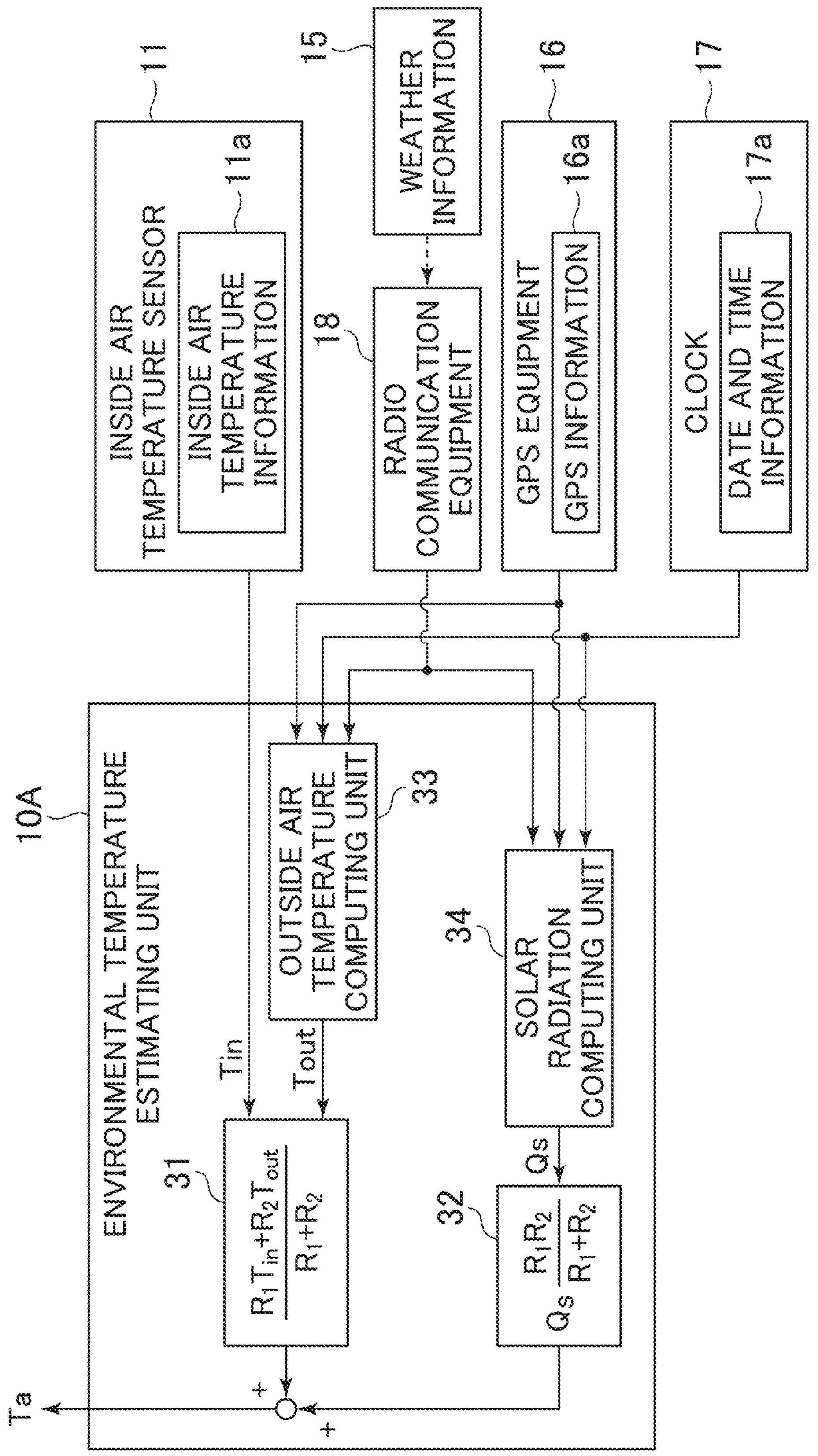
FIG. 10 is a block diagram showing an example processing performed by an environmental temperature estimating unit according to a second embodiment of the present invention.

FIG. 10 is a block diagram showing an example processing performed by an environmental temperature estimating unit 10A according to the second embodiment. Described here is an example processing of estimating the environmental temperature of the wire harness 5 using information obtained from the outside of the vehicle 20 via the radio network.

The environmental temperature estimating unit 10A estimates the environmental temperature of the shielded space 23 in which the wire harness is installed using date and time information 17*a* in addition to the inside air temperature information 11*a*, the weather information 15, and the GPS information 16*a*. Therefore, the environmental temperature estimating unit 10A includes an outside air temperature computing unit 33 and a solar radiation computing unit 34 in addition to the first term computing unit 31 and the second term computing unit 32 used in the model formula (1). This computing unit (environmental temperature estimating unit 10A) calculates a current position of the vehicle 20 based on the GPS information 16*a* received from a GPS information receiving unit (GPS equipment 16), obtains the weather information 15 at the current position from a radio communication unit (radio communication equipment 18) using the date and time information 17*a*, and calculates the outside air temperature information 12*a* and the solar radiation information 13*a* based on the weather information 15.

The environmental temperature estimating unit 10A obtains the inside air temperature information 11*a* from the inside air temperature sensor 11 in the vehicle cabin of the vehicle 20. The inside air temperature sensor 11 is installed in a location shielded from the solar radiation such as an interior of the vehicle cabin, and can use a thermistor used for controlling an air conditioner, for example.

Moreover, the environmental temperature estimating unit 10A obtains the weather information 15 by receiving a radio wave from a mobile phone base station or the like using the radio communication equipment 18 disposed in the vehicle 20. The weather information 15 includes at least information about the weather and temperature with respect to each area.

Moreover, the environmental temperature estimating unit 10A obtains the GPS information 16*a* from the GPS equipment 16 included in an unshown navigation system loaded on the vehicle 20. The GPS information 16*a* is positional information indicative of the current position of the vehicle 20. The GPS information 16*a* is used to identify where the vehicle 20 is travelling. The GPS information 16*a* is input to the outside air temperature computing unit 33 and the solar radiation computing unit 34.

The date and time information 17*a* is information about date and time when the vehicle 20 is travelling. The date and time information 17*a* discloses whether the vehicle 20 is travelling in the daytime or at night. The environmental temperature estimating unit 10A can not only obtain the date and time information 17*a* from a clock 17 disposed in the vehicle 20 but also obtain the date and time information 17*a* by receiving the radio wave carrying time information from the outside.

The outside air temperature computing unit 33 has a function of computing the outside air temperature. The weather information 15 is input to the outside air temperature computing unit 33 via the radio communication equipment 18. Moreover, the GPS information 16*a* is input to the outside air temperature computing unit 33 from the GPS equipment 16 and the date and time information 17$a$ is input to the outside air temperature computing unit 33 from the clock 17. The outside air temperature computing unit 33 selects the weather information 15 of an area including the current position of the vehicle 20 based on the GPS information 16$a$. The outside air temperature computing unit 33 also selects the weather information 15 of the area at the current time based on the date and time information 17$a$. The outside air temperature computing unit 33 then computes the outside air temperature of the vehicle 20 based on the weather information 15, the GPS information 16$a$, and the date and time information 17$a$, and outputs the computed outside air temperature Tout to the first term computing unit 31.

The solar radiation computing unit 34 has a function of computing an amount of solar radiation. The amount of solar radiation computed by the solar radiation computing unit 34 is calculated as the heat inflow Qs caused by the solar radiation shown in the above formula (1). The weather information 15 is input to the solar radiation computing unit 34 via the radio communication equipment 18. Moreover, the GPS information 16$a$ and the date and time information 17$a$ are input to the solar radiation computing unit 34. The solar radiation computing unit 34 selects the weather information 15 of the area including a place where the vehicle 20 is travelling based on the GPS information 16$a$. The outside air temperature computing unit 33 also selects the weather information 15 of the area at the current time based on the date and time information 17$a$. The outside air temperature computing unit 33 then computes the amount of solar radiation based on the weather information 15, the GPS information 16$a$, and the date and time information 17$a$, and outputs the computed amount of solar radiation to the second term computing unit 32 as the heat inflow Qs caused by the solar radiation.

The first term computing unit 31 computes the first term of the formula (1) using the inside air temperature information 11$a$ (Tin) and the outside air temperature information 12$a$ (Tout) from the outside air temperature computing unit 33 as inputs.

The second term computing unit 32 calculates the second term of the formula (1) using the heat inflow Qs due to the solar radiation, the heat resistance R1 of the body 21 of the vehicle 20, and the heat resistance R2 of the inner lining 22 as inputs.

The environmental temperature estimating unit 10A then estimates the environmental temperature Ta by adding an arithmetic result of the first term computing unit 31 and an arithmetic result of the second term computing unit 32, and outputs the environmental temperature Ta to the conducting wire temperature estimating unit 8. The conducting wire temperature estimating unit 8 then estimates the temperature of the wire harness 5 based on the estimated value of the environmental temperature Ta, and the interruption determining unit 9 determines to interrupt the current if the temperature estimation value from the conducting wire temperature estimating unit 8 is higher than the predetermine threshold, and outputs the interruption signal to the interrupting element 4.

The environmental temperature estimating unit 10A according to the second embodiment described above calculates the outside air temperature Tout and the amount of solar radiation Qs in which the vehicle 20 is travelling by checking the weather information 15, the GPS information 16$a$, and the date and time information 17$a$ with one another. The environmental temperature estimating unit 10A then computes the weighted average value using the calculated outside air temperature Tout and the inside air temperature information 11$a$ (Tin) as weightings corresponding to the heat resistance R1 and the heat resistance R2. Moreover, the environmental temperature estimating unit 10A computes the temperature rise value due to the heat inflow Qs caused by the calculated solar radiation. The environmental temperature estimating unit 10A can now estimate the by adding these arithmetic results.

The environmental temperature estimating unit 10A shown in FIG. 10 does not require the vehicle 20 to load thereon the solar radiation sensor 13 for obtaining the solar radiation information 13$a$, and can estimate the environmental temperature Ta even in the vehicle 20 that does not include the solar radiation sensor 13.

Although the environmental temperature estimating unit 10A was described to be configured to obtain the outside air temperature information from the weather information, it may be configured to use the outside air temperature sensor 12 loaded on the vehicle 20. For example, the environmental temperature estimating unit 10A may be configured to combine a method of obtaining the outside air temperature information 12$a$ from the outside air temperature sensor 12 loaded on the vehicle 20 via the in-vehicle network and a method of obtaining the outside air temperature information 12$a$ via an external network shown in FIG. 10 as appropriate. The methods to be combined can be selected according to the presence of the sensor loaded on the vehicle 20, the temperature estimation precision of the wire harness 5, and the like as appropriate.

Moreover, when the outside air temperature computing unit 33 computes the outside air temperature, the processing of changing the temperature added to the outside air temperature is assumed depending on whether the vehicle 20 is located in a shady parking lot or travelling on a road. If the vehicle 20 is travelling, an arithmetic operation may be performed using a sum of an average temperature calculated from the weather information 15 in the shady parking lot plus a few degrees as the outside air temperature. In this manner, by the outside air temperature computing unit 33 computing the outside air temperature to be higher, the current through the wire harness 5 can be safely interrupted even if the temperature is estimated to be higher than the actual temperature of the wire harness 5.

It should be noted that the present invention is not limited to the above-described embodiments but can naturally take various application examples and modification examples without departing from the scope of the present invention set forth in the claims.

For example, each embodiment described above specifically describes a configuration of the device and the system in detail for better explaining the present invention, and is not limited to necessarily include all the configurations described above. Moreover, it is possible to replace a part of a configuration of the embodiment described herein with a configuration of another embodiment, and it is also possible to add a configuration of one embodiment to a configuration of another embodiment. Furthermore, a part of a configuration of each embodiment can also be added to, deleted from, or replaced with another configuration.

Moreover, this application describes control lines and information lines assumed to be necessary for the explanation, but not necessarily describes all the control lines and information lines in the product. It may be considered that almost all the configurations are actually connected to one another.

LIST OF REFERENCE SIGNS

1: overheat protection system, 2: battery, 3: current detecting element, 4: interrupting element, 5: wire harness, 6: load device, 7: computing element, 8: conducting wire temperature estimating unit, 9: interruption determining unit, 10: environmental temperature estimating unit, 11: inside air temperature sensor, 12: outside air temperature sensor, 13: solar radiation sensor, 14: power source distribution unit, 16: GPS equipment, 17: clock, 18: radio communication equipment, 20: vehicle, 23: shielded space, 31: first term computing unit, 32: second term computing unit, 33: outside air temperature computing unit, 34: solar radiation computing unit

The invention claimed is:

1. A vehicle control device, comprising:

a current detecting unit that detects a current flowing through a lead wire and outputs a current detection value;

a current interrupting unit that interrupts the current flowing through the lead wire; and a computing unit that computes a temperature rise value caused by Joule heat in the lead wire using the current detection value, estimates an environmental temperature of an environment in which the lead wire is wired based on the temperature rise value, outside air temperature information of a vehicle, inside air temperature information in a vehicle cabin, and solar radiation information, and determines whether to output a current interrupting instruction to the current interrupting unit based on the temperature of the lead wire estimated using the environmental temperature, wherein a shielded space in which the lead wire is wired is formed between an outside air environment of the vehicle and an inside air environment, the shielded space being thermally shielded from the outside air environment and the inside air environment, the outside air temperature information is temperature information of the outside air environment, and the inside air temperature information is temperature information of the inside air environment, and the computing unit estimates the environmental temperature by adding a temperature rise value based on the solar radiation information to a weighted average value of the inside air temperature information and the outside air temperature information.

2. The vehicle control device according to claim 1, wherein the environment is a shielded space in which the lead wire is wired, and the computing unit estimates the temperature of the lead wire by adding the environmental temperature of the shielded space to the temperature rise value.

3. The vehicle control device according to claim 1, wherein the computing unit sets the weighted average value according to a quality of the vehicle body material that shields between the outside air environment and the shielded space and a quality of an inner lining material that shields between the inside air environment and the shielded space.

4. The vehicle control device according to claim 1, wherein the computing unit sets a coefficient of the solar radiation information according to an emissivity of the vehicle body material that shields between the outside air environment and the shielded space.

5. The vehicle control device according to claim 4, wherein the computing unit calculates a current position of the vehicle based on GPS information received from a GPS information receiving unit, obtains weather information at the current position from a radio communication unit using date and time information, and calculates the outside air temperature information and the solar radiation information based on the weather information.

6. The vehicle control device according to claim 1, wherein the computing unit obtains the outside air temperature information from an outside air temperature detecting unit installed in the vehicle, obtains the inside air temperature information from an inside air temperature detecting unit installed in the vehicle, and obtains the solar radiation information from a solar radiation detecting unit installed in the vehicle.

7. An overheat protection device that computes a temperature rise value caused by Joule heat of a lead wire using a current detection value output from a current detecting unit that detects a current flowing through the lead wire, estimates an environmental temperature of an environment in which the lead wire is wired based on the temperature rise value, outside air temperature information of a vehicle, inside air temperature information in a vehicle cabin, and solar radiation information, and determines whether to output a current interrupting instruction to a current interrupting unit that interrupts a current flowing through the lead wire based on a temperature of the lead wire estimated using the environmental temperature, wherein a shielded space in which the lead wire is wired is formed between an outside air environment of the vehicle and an inside air environment, the shielded space being thermally shielded from the outside air environment and the inside air environment, the outside air temperature information is temperature information of the outside air environment, and the inside air temperature information is temperature information of the inside air environment, and the environmental temperature is estimated by adding a temperature rise value based on the solar radiation information to a weighted average value of the inside air temperature information and the outside air temperature information.

8. A method, comprising:

detecting a current flowing through a lead wire and outputs a current detection value;

interrupting the current flowing through the lead wire; and computing a temperature rise value caused by Joule heat in the lead wire using the current detection value;

estimating an environmental temperature of an environment in which the lead wire is wired based on the temperature rise value, outside air temperature information of a vehicle, inside air temperature information in a vehicle cabin, and solar radiation information; and determining whether to output a current interrupting instruction based on the temperature of the lead wire estimated using the environmental temperature, wherein a shielded space in which the lead wire is wired is formed between an outside air environment of a vehicle and an inside air environment, the shielded space being thermally shielded from the outside air environment and the inside air environment, the outside air temperature information is temperature information of the outside air environment, the inside air temperature information is temperature information of the inside air environment, and the environmental temperature is estimated by adding a temperature rise value based on the solar radiation information to a weighted average value of the inside air temperature information and the outside air temperature information.

9. The method according to claim 8, wherein the environment is a shielded space in which the lead wire is wired, and the temperature of the lead wire is estimated by adding the environmental temperature of the shielded space to the temperature rise value.

10. The method according to claim 8, further comprising setting the weighted average value according to a quality of the vehicle body material that shields between the outside air environment and the shielded space and a quality of an inner lining material that shields between the inside air environment and the shielded space.

11. The method according to claim 8, further comprising setting a coefficient of the solar radiation information according to an emissivity of the vehicle body material that shields between the outside air environment and the shielded space.

12. The method according to claim 11, further comprising calculating a current position of the vehicle is based on GPS information received from a GPS information receiving unit;

obtaining weather information at the current position from a radio communication unit using date and time information; and calculating the outside air temperature information and the solar radiation information based on the weather information.

13. The method according to claim 8, further comprising:

obtaining the outside air temperature information from an outside air temperature detecting unit installed in the vehicle;

obtaining the inside air temperature information from an inside air temperature detecting unit installed in the vehicle; and obtaining the solar radiation information from a solar radiation detecting unit installed in the vehicle.

* * * * *